United States Patent [19]

Sanko

[11] Patent Number: 5,470,428
[45] Date of Patent: Nov. 28, 1995

[54] FLOW-THROUGH LINEAR TRANSFER SYSTEM FOR MAKING CREDIT CARDS AND THE LIKE, FROM SYNTHETIC RESINOUS SHEETS

[75] Inventor: William J. Sanko, Fairview, Pa.

[73] Assignee: Alfred D. Lobo Co., L.P.A., Cleveland, Ohio; a part interest

[21] Appl. No.: 81,639

[22] Filed: Jun. 24, 1993

[51] Int. Cl.⁶ .................................................. B30B 15/34
[52] U.S. Cl. ........................ 156/498; 156/539; 156/583.1; 100/196; 100/207; 198/346.2
[58] Field of Search ..................................... 156/498, 539, 156/583.1; 100/137, 196, 207; 198/346.1, 346.2, 465.3, 817, 803.2

[56] References Cited

U.S. PATENT DOCUMENTS

| 3,241,189 | 3/1966 | Siempelkamp | 425/143 |
|---|---|---|---|
| 3,752,060 | 8/1973 | Hubert et al. | 100/196 X |
| 4,337,113 | 6/1982 | Searle | 156/353 |
| 4,478,673 | 10/1984 | Plocher | 156/498 |
| 4,543,147 | 9/1985 | Noto et al. | 156/288 |
| 4,565,481 | 1/1986 | Pagnoni | 414/285 |
| 4,658,947 | 4/1987 | Welder | 198/346.2 |
| 4,846,925 | 7/1989 | Ishida et al. | 156/583.1 |
| 4,936,765 | 6/1990 | Bonvini | 425/144 |
| 5,066,351 | 11/1991 | Knoll | 156/212 |

Primary Examiner—David A. Simmons
Assistant Examiner—J. Sells
Attorney, Agent, or Firm—Alfred D. Lobo

[57] ABSTRACT

A simple combination of conventional operations uses a twin press configuration of tandem stationary, vertically acting heating and cooling platen presses in separate frames of a laminating machine which is loaded by rollingly transferring a book into the heating press in either of two loading-paths. One is at right angles to the path in which the book is to be processed ("process-path") so as to avoid using an entrance station. The other uses an entrance station which provides a loading-path parallel to the processing path through daylight openings ("daylights") in the presses, so as to support each book on the edge-conveyor means while it is stationary and coplanar with the loading-path. The system operates with a minimum cycle time based on the physical properties of the sheets to be laminated. Successive books may be loaded, in a machine using only two single daylight openings; or in one using only two multiple daylights; or, in ganged single daylights; or, in ganged multiple daylights; depending upon the capacity per unit time sought. A novel quick-locking carrier is provided in which a sandwich to be laminated is held.

12 Claims, 12 Drawing Sheets

FLOW-THROUGH LINEAR TRANSFER SYSTEM FOR MAKING CREDIT CARDS AND THE LIKE, FROM SYNTHETIC RESINOUS SHEETS

BACKGROUND OF THE INVENTION

This invention relates generally, to the art of making a laminate of plural large sheets of thermobondable, laminar stock. More particularly, it relates to a laminating machine and to a process of making a laminate in a unique laminating system. The term "system" is used to refer to the laminating machine in combination with the roller means supported on tables, which roller means allow the work to be returned to an operator of the machine. The term "laminating machine" refers to a combination which comprises, tandem heating and cooling platen presses, a pair of endless loop conveyor means which support the "work" only near its opposed lateral edges and which together guide the work and position it with appropriately timed stops and starts, to a discharge station.

At least one side of one of the sheets is imprinted or otherwise marked with indiciae providing data on the card, which data are to be read, either visually by human eyes, or by a photoelectric means such as a photoelectric eye, or some other data reading means. When the laminate is to yield wallet-size (about 8.5 cm long×5.5 cm wide) credit cards, indiciae include a logo and/or letters spelling out the name, or otherwise indicating the issuer of the card, shapes of different color printed against a background of yet another color, a hologram, which together unmistakably identify the issuer, and also, letters spelling out the name of an individual or organization to which the card is issued, with numerals which provide an identification code, and optionally still other alphanumeric symbols which serve the purpose of providing information desired by the issuer of the card when it is used or misused for its (the card's) specified purpose. Such letters, numerals and symbols are typically embossed to raise them above the smoothly planar surface of the card, and correspondingly to indent them on the card's rear surface. Operating instructions to be left outdoors on "instructions" card for a machine, a frequently used map of a city, or of a geographical region, or any information on a card which is frequently handled, may also be provided on, or cut from, a laminate made in the machine of this invention.

The problems encountered in the production of a laminate such as the one produced herein stem from uneven temperature and pressure distribution, and particularly having to transport and store hot pressed laminates before they are cooled under pressure. The physical limitations of a sheet of thermobondable synthetic resinous material from which the laminate is made, and the requirement that the laminate maintain essentially the same sharpness of color and resolution of image as in a printed sheet of paper, after it has been subjected to aggressive heating and cooling conditions, requires that the work be treated (heated then cooled) only after it is encased between the cover plates of a thermally conductive carrier. These preconditions distinguish the task at hand from laminating plywood, forming laminates of inorganic materials which are adhesively bonded, or thermobonding a thermoplastic transparent film to a document, or heat-sealing a thermally substantially insensitive article, such as a paper document, between opposed such films.

Though a large laminate of plural sheets of thermobondable stock is technically designated the "work" in this art, it will be referred to herein as a "large laminated sheet of credit cards", and for brevity, "a laminate". A laminate is typically formed from an assembly of a core sheet, or split core sheets in congruent contact with each other, held between upper and lower transparent protective foils termed "overlays". The function of the overlays is to provide an attractive finish, and at the same time, to protect the core stock from the effect of sunlight, moisture, and to help resist wear and tear from frequent use of the card. A core sheet of plural core sheets is termed a "split core". Such a laminar assembly of a core sheet(s) and overlays is referred to as a "product pack" or "set". An assembly of such sets, typically from 1 to 10, though as many as 20 may be used if the materials to be laminated allow, is referred to herein as a "sandwich". To be "processed" (compressively heated, then cooled), a sandwich is placed in a sandwich "carrier" comprising upper and lower cover plates between which the sandwich is tightly and compressibly held. The carrier with the sandwich in it, is termed a "book".

A set typically comprises at least one sheet of core stock of uniform thickness, and often two sheets, of relatively thick core stock (relative to the "overlays") of thermoplastic synthetic resinous material suitably imprinted or, otherwise marked with indiciae, between opposed overlying "overlays" of "finish stock" or "plastic film" each overlay congruently disposed upon the exposed upper and lower surfaces of the core sheet(s). The core sheet(s) is relatively thick, from about 0.25 mm (10 mils) to 1.27 mm (50 mils), compared to the overlays. Such an overlay may be a self-supporting thermoplastic, essentially light-permeable (that is, transparent) thin sheet from about 0.00635 mm (0.25 mil) to 0.0762 mm (6 mils) thick, or a non-self-supporting thin film from about 1.25µ (0.1 mil) to about 6.25µ (0.5 mil), of a thermoplastic resinous material referred to as a "varnish" which is chosen because it is compatible with the thermoplastic core sheet stock upon which it is coated, for example by screen printing it on, to provide a layer of uniform thickness. By "compatible" is meant that, upon heating under pressure at a temperature above the Tg of the overlay, the overlay is thermally bonded to the core stock, so that there is no phase separation and no discernible boundary therebetween. The outer surfaces of the core stock may also be coated with an adhesive which is compatible with both, the core stock and the polymeric material of the overlay.

In addition, each sandwich, whether of a single or plural sets, necessarily includes a pair of flexible, elastomeric sheets of uniform thickness, referred to as "lamination pads" placed above and below the upper most and lowermost set in a sandwich. The lamination pads perform a critical function, namely, they distribute the pressure exerted by the platens essentially uniformly over the surface of the overlays and core sheet, and are typically placed between the cover plate and the first polished plate. Insufficient pressure over even a small area, from 0.1 mm$^2$ to 1 mm$^2$ will cause "lakeing" namely leaving a depression in the surface, a defect which may be visually observed by tilting the surface of a laminate at an angle towards a beam of light. Too great a pressure, on the other hand, will cause "running" evidenced by the edges of the laminate being advanced past the original boundaries of the core sheet, and bleeding of the colors of the inks used to print the indiciae on the core sheet. Both distortion and bleeding of colors is also encountered when the hot laminate is held in the book too long.

Though a sandwich of a single set may be processed, it is impractical to process individual sets separately. Therefore, typically, multiple sets are simultaneously processed by interleaving each set with a thin metal plate from 0.49 mm (20 mils) to 0.98 mm (40 mils) thick, typically 0.635 mm (25 mils), having highly polished or microfinished surfaces which transfer their finish to the overlays. In practice, a sandwich may include from 5 to 20 sets having from 6 to 21 polished plates, respectively. Even more so than with a single set, it is critical that a chosen set pressure, typically about 689 Kpa (100 psi) in the heating press, and about 2756 kPa (400 psi) in the cooling press, will be exerted essentially continuously on the multiplicity of sheets in a sandwich, after the carrier is biased against the upper stationary platen, and that this pressure be uniformly distributed. By "uniformly distributed" is meant that there is no difference in pressures exerted per unit area measured at spaced-apart, coplanar portions in either the uppermost surface of a set, or, in portions in the lowermost surface of a set, sufficient to cause a visually unacceptable finish on the processed laminate.

Each sandwich is placed between rigid upper and lower cover plates, one vertically aligned above the other, having mutually facing planar surfaces for contacting the upper and lower surfaces of a set, and having lengthwise and widthwise dimensions exceeding those of the sandwich. Such a laminar assembly is referred to as a "book". Each book is compressively heated, then cooled, each of these steps being carried out under pressure, to form the laminate. The cover plates are biased, one against another, under a pressure which is maintained essentially constant during the heating cycle, and is exerted in a direction orthogonal (at right angles) to the direction in which the book is to be translated on a conveyor. One skilled in the art will appreciate that the specifications for the cover plates will depend upon the demands of rigidity, which in turn will depend upon the pressures to be experienced in the press. For obvious reasons, metals are chosen with high thermal conductivity and a high modulus of elasticity in shear or a high coefficient of rigidity. Since metals such as aluminum have high thermal conductivity but a lower coefficient of rigidity than steel, a common preferred choice is a cover plate from about 1 cm (0.375") to 2 cm (0.75") thick of aluminum, or bronze where the cost can be justified.

Instruction cards, and credit cards in particular, are issued by the tens of thousands, and sometimes the million, to persons and organizations many of whom may, or may not, be benefitted by the receipt and use of the card. Since the cards are generally to be made in a single "production run", there is a high premium on the rate at which a "book" can be processed.

Until relatively recently, a book was processed in conventional laminating devices comprising upper and lower "dual-function" platens (so termed because they could both heat and cool the "work"), one or both of which were provided with hydraulic motive power to move at least one of the platens in the vertical direction, so that the lower face of the upper platen and the upper face of the lower platen tightly held and compressed the "work" therebetween. The dual-function platens were each provided with internal or external heating means, which in conjunction with appropriately programmed electrical timer means, enabled the platens to be synchronously heated to the desired temperature at which satisfactory lamination was effected; and, each platen was also provided with internal or external cooling means which enabled the platens, after each set in each book was laminated or otherwise treated, to be synchronously cooled to the desired temperature at which the "book" could be discharged from between the cold platens. However, the loss of time inherent in having to cool a heated platen after a "book" was processed in a dual-function platen press, was unacceptable when a large order or "run" of credit cards had to be delivered to a purchaser (eventually, the issuer of the credit cards) under the pressure of an unrealistically short deadline. Some of the problems endemic with dual-function presses equipped with multiple platens are addressed in U.S. Pat. No. 3,241,189 to Siempelkamp.

This problem, namely, the need to deliver a very large number of satisfactorily laminated credit cards in a short time, implanted an expectation of high productivity in prospective purchasers and users of laminating presses for credit cards, which expectation resulted in this characteristic becoming the sine qua non specification to be met by a laminating machine which was acceptable to such a purchaser or user.

To this end, laminating presses have been constructed with the emphasis on economy and ease of operation, and speed. For example, in U.S. Pat. No. 4,543,147 to Noto et al, the discovery that the compressive heating of a book could be interrupted, led to the use of a bi-level tandem multiple daylight opening presses in which the platens intermediate the ram platen and the fixed upper platen, were interconnected for identical up-and-down movement. Each press has one daylight opening for heating and the other daylight opening (or "daylight" for brevity) in the same press, for cooling. After treatment in one (the upper level, shown) of the machine, books are stacked in a stacking press, and on their return, the books are treated in the lower level, by being sequentially precooled in the same press they are finish-heated (a very large temperature difference $\Delta T$), then finish-cooled in the same press they were pre-heated (a smaller, but still large $\Delta T$).

The net effect is to reduce the cycle time for a book. But their requirement that there be vertically spaced apart entrance and discharge stations, so that the press may be operated by a single operator stationed at the entrance station of the press, resulted in having to use a "stacking press" which provided no function other than to return the heated book to the first of two tandem cooling presses. In addition to the cost of an additional press, the stacking press provides a substantial delay between transfer of a book from the heating to the cooling zones which is generally deleterious in making laminates which are highly sensitive to the heating and cooling cycles, as is, in particular, the laminate of this invention.

Moreover, the use of heating and cooling cycles in the same press require that the same pressure be used for heating and cooling. This is incompatible with maximizing the "window of lamination" which dictates one use the lowest practical pressure in the heating cycle to minimize "bleeding" of colors and distortion of lines, and, the highest practical pressure in the cooling cycle to "iron out" microscopic and submicroscopic surface irregularities when the polymer as cool as will permit doing so, again to minimize distortion. Making most laminates demands utilizing the "window" to allow one to meet the quality criteria for a no-defect, high-gloss, "ultra-finish".

Further, a finish-heating cycle in the upper daylight of the same press in which the lower daylight is used to precool a book, requires the press to operate reliably despite an inordinate temperature gradient $\Delta T$ which is only slightly less in the first press where the upper daylight is used to preheat, and the lower daylight to finish-cool, than in the second press.

A different approach utilized a "stack" of several "books" which could be simultaneously loaded into successive heating and cooling presses, each of which comprised multiple platens, referred to as multiple opening presses.

A press with a single pair of platens is referred to as a "single daylight opening" (or "SDO") press, or a "single daylight" (or "SD") press, and a press with multiple daylight openings is referred to as a multiple daylight opening ("MDO") press, or, a multiple daylight ("MD") press. Such MDO presses are commercially available from Robert Burkle Gmbh & Co., West Germany; and, Oakwood Design, England; inter alia. Because these presses rely on each book in an opening of a free standing MDO heating press "shunting" another book into its subsequent position in a corresponding opening of a MDO cooling press, any significant misalignment of the shunting and shunted books in the lateral plane, results in a problem. Further, such prior art MDO presses require the use of a loading device which simultaneously pushes multiple books to feed the books from a storage magazine to the MDO heating press, and thence to the cooling press, and it is difficult to maintain the path of the books in a longitudinally axial path.

Against this background of concentrated effort devoted to solve the problems endemic to the operation of a laminating machine for a set of thermoformable synthetic resinous sheets, for making laminates of all types and sizes including plywood, identification cards and circuit boards, this invention provides easily available components which in combination can be adapted for any of the foregoing purposes. With the use of MDO presses, and ganged heating and cooling presses, the cycle time for processing a book may be lowered to be competitive with any known machine.

As will be described in greater detail below, the basic embodiment of the laminating machine and the process for making laminates simply and efficiently, may be adapted to a two-step heating and two-step cooling machine (referred to as the "two-step" machine).

In another embodiment referred to as the "MDO machine" multiple books, in a "stack" of spaced apart books, are laminated concurrently, then cooled and discharge concurrently, using only one MDO heating press and only one MDO cooling press in a two-press mode. Since each daylight requires its own fixedly mounted, edge-conveyor means, it will be evident that it is essential that the endless loops be tightly looped, that is, returned with a radius less than about 7.5 cm if the travel of the ram is 7.5 cm, or the conveyors will interfere with the travel of the platens. Further, such an MDO machine requires that provisions be made to load the vertically spaced apart daylights from an appropriate loading-conveyor; and, unload vertically spaced apart discharge stations with an appropriate discharge-conveyor. Details for the construction and operation of tandem MDO heating and cooling presses in an MDO machine are provided herebelow for those instances when high production in a short time is demanded.

For maximum production, still another embodiment, referred to as the "ganged tandem MDO machine" is used. Details for the construction and operation of ganged tandem MDO heating and cooling presses in a ganged MDO machine are provided herebelow for those instances when maximum production in a minimum time is demanded.

SUMMARY OF THE INVENTION

It has been discovered that the overheating of a book containing a sandwich of plural sets of thermobondable, synthetic resinous material, whether thermoformable or thermoplastic, or both, is more likely to give rise to defects in a heated laminate than the interruption of a heating cycle during which the laminate is formed; and, that maintaining the platens of the same heating or cooling press, each at the same desired temperature, unexpectedly results in economically attractive cycle times for making a laminate.

It is therefore a general object of this invention to provide a laminating system which avoids storing heated laminates and accelerates their cooling so as to minimize the deleterious effects of transporting and storing a hot laminate for more than about 1 minute, preferably to keep the period between the start of a cooling cycle and the completion of a heating cycle to less than 30 sec.

A simple combination of conventional operations uses a twin press configuration of tandem stationary, vertically acting heating and cooling platen presses in separate frames of a laminating machine which is loaded by rollingly transferring a book into the heating press in a loading-path at right angles to the path in which the book is to be processed ("process-path"). The system operates with a minimum cycle time based on the physical properties of the sheets to be laminated. Successive books may be loaded, one at a time, to be processed in a flow-through linear processing path from the heating press, through the cooling press, and onto a discharge station where the book is disassembled to yield a uniformly heated and cooled laminate the surfaces of which are free of objectionable defects.

It is therefore a general object to provide a system for producing a laminate, the apparatus comprising, sequential tandem heating and cooling presses; laterally spaced apart endless loop, support and conveyor means each side of which supports opposed laterally spaced apart edges of a book (hence referred to as "edge-conveyor means") and advances a book unidirectionally only in the direction of the process path while the book is being processed; and, a loading-conveyor means and a discharge-conveyor means both supported during operation, in substantially the same lateral plane as the edge-conveyor means. Together, the edge-conveyor means, which extends continuously over the length of the process path, and the loading- and discharge-conveyor means leading to the heating press, permit directly loading the heating press and unloading the cooling press, respectively, without interrupting the flow of books (seriatim to the heating press) at an entrance station, and the edge-conveyor means permits simultaneously transferring a first edge-supported book through the heating press while a second book is simultaneously transferred to the cooling press, and a third book is being discharged from the cooling press to a discharge station.

Throughout the system, the loading-path, the process-path and discharge-path of each book is maintained in substantially the same lateral plane. This is possible because the lower heating and cooling platens are indexable in a vertical direction so that they accept and discharge a book located on the conveyor means and positioned directly above the upper surfaces of the lower platens. If desire or operator custom dictates that an operator maintain better visual alignment of a book into the first daylight, the loading-conveyor means leading to the heating press is advanced to a location in front of the heating press, and the feed-conveyor means is extended ahead of the heating press, so that the loading path of a book is aligned with the process path. The operator can then position a book to be processed, precisely on the extended front portion of the conveyor means, using a fluid-actuated elevator roller table, and watch the edge-conveyor means advanced the book into the first daylight until the book is indexed into position above the lower heating platen of the heating press.

More particularly, the invention relates to a laminating machine used to apply and thermally, as well as, optionally, adhesively bond one sheet of synthetic resinous material to another, for example, by transferring a compressively heated book to a cooling station in less than 20 sec, allowing a large laminate 2 m (meters) long and 1 m wide to be produced with a defect-free surface, such as is required in the manufacture of credit cards, instruction cards, and the like.

Still more particularly, this invention relates to a laminating machine comprising separate, hot and cold fluid-actuated stationary platen presses, each operating with a pair of upper and lower horizontal platen surfaces, only the lower one of which is driven vertically upwards towards the upper fixed platen, and each of the presses are longitudinally spaced apart (in the direction of the x-axis) in the direction in which the book is to be transferred, essentially linearly, between the hot and cold presses on a pair of laterally spaced apart (along the y-axis) separate endless belts upon which opposed lateral edges of the book rest when it is to be transferred from the hot, to the cold press.

The conventional process for sequentially forming a series of laminates in a laminating system comprising heating and cooling presses, but free of a stacking press, comprises loading books, each tightly holding at least one set of congruently stacked thermobondable sheets of a synthetic resinous material, into at least one daylight opening of a heating press having at least an upper and a lower heating platen, and optionally one or more intermediate platen assemblies; heating and compressing the sheets to form a heated laminate; transferring the heated laminate into a daylight opening of a cooling press having an upper and a lower cooling platen; cooling and compressing the sheets to form a cooled laminate; and discharging a cooled laminate from the cooling press; wherein each of said foregoing steps are carried out at predetermined intervals; has been improved by:

a) introducing books, one at a time, into the daylight opening(s) provided between the upper fixed and lower reciprocable heating platens maintained at a laminating temperature above the glass transition temperature or the melting point of the material, using either (i) a loading-path orthogonal to the processing path and into openings in the heating press without interrupting the loading path with an entrance station, or, (ii) an entrance station which provides a loading-path parallel to the processing path through corresponding daylight openings in the presses, so as to support each book on the edge-conveyor means while it is stationary and coplanar with said loading-path;

b) advancing the reciprocable lower platen of the heating press upward to raise each book off the edge-conveyor means and bias the book against the upper heating platen directly above and in spaced apart relation with the lower platen;

c) retracting the lower platen downward to lower the book on to the edge-conveyor means;

d) conveying each book into each daylight opening of the cooling press and biasing each book against the upper cooling platen for a predetermined time until the book is cooled to a temperature below the glass transition temperature or melting point of the material from which the laminate is formed;

e) and discharging each cooled book from the cooling press while simultaneously introducing another book into the daylight opening.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which:

FIG. 1A is a photograph of an approximate plan view.

FIG. 2A is a photograph of an approximate perspective view.

FIG. 3A is a photograph of an approximate front end elevation though also in perspective view.

FIG. 4A is a photograph of an approximate top plan view though also in perspective view.

FIG. 5A is a photograph of an approximate elevational view though also in perspective view.

DETAILED DESCRIPTION OF PREFERRED EMBODIMENTS

The foregoing essential features of the novel laminating machine are provided in a combination of structural elements, and in mechanisms which are as simple to make as they are to operate. In a basic embodiment, only two SDO presses are used, the first a heating press, and the second a cooling press, the platens of each being held at a substantially constant temperature. This simple design in combination with maintaining substantially coplanar conveyors, namely the loading conveyor, edge-conveyor means, and discharge conveyor, unexpectedly results in elimination of storage of a hot book, allows a linear flow-path of the book while it is being moved longitudinally, and minimizes the cost of hardware since the heating press is side-loaded.

A first embodiment of the machine and the system will be described with reference to making a typical laminate in which two split core sheets are to be laminated with their blank sides back-to-back and their printed front and rear faces each protected with a transparent overlay. Each core sheet is 58.42 cm×71.12 cm (23"×28") and yields 80 individual wallet-size cards when cut; a smaller sheet is typically 50.08 cm×66.04 cm (20"×26") cut to 50 cards/sheet, and a larger one is 66.04 cm×193.55 cm (25"×30") cut to 100 cards/sheet.

A core sheet is typically of an essentially amorphous polymer such as poly(vinyl chloride) ("PVC") having a Tg in the range from 80°–85° C., or a polyester which is a copolymer commercially available under the Kodar trademark which has a comparable Tg, or a copolymer of styrene-acrylonitrile which has a Tg of about 108° C., or poly(methylmethacrylate), or a blend of styrene and poly(phenylene oxide) commercially obtainable under the Norel trademark which has a higher Tg; a core sheet may also be formed from a substantially crystalline polymer such as nylon, or a crystalline polyester having melting points in the range from 50° C. to 90° C., but with much less tolerance for temperature variation during the heating stage. The overlay may be chosen from the foregoing polymers in the form of a self-supporting film typically <0.0127 mm (0.5 mil) thick; or, it may be a non-self-supporting varnish to be coated upon the core sheets. Such a varnish is commercially obtainable from Apollo Chemical under the Allcolours brand. The core sheets and the overlays may each be made from the same or different polymers so long as the Tg and/or melting point are relatively closely matched.

Figure 1:
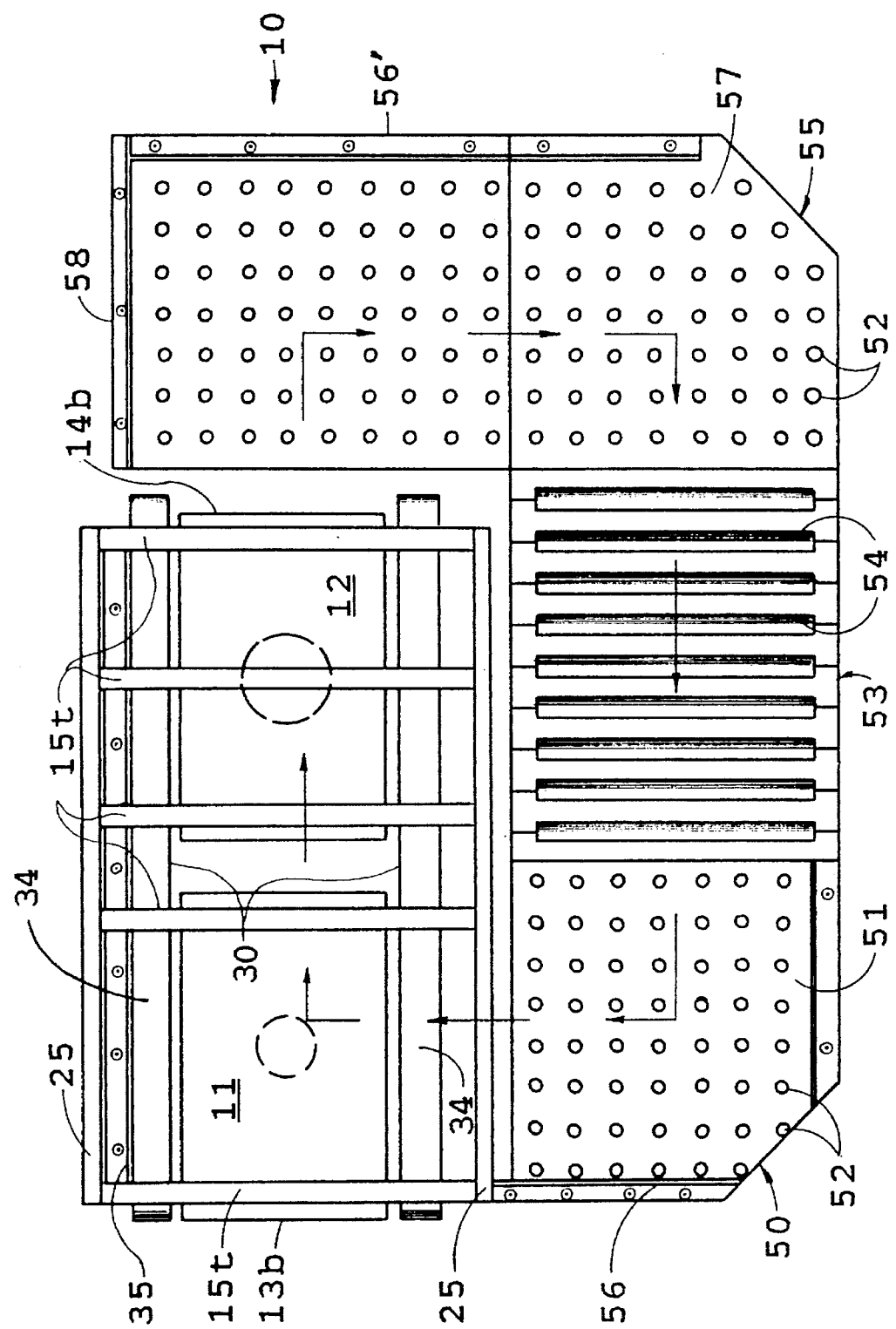
FIG. 1 is a top plan view of an embodiment of the laminating system (using the "basic" machine) in which books are side-loaded directly from a loading conveyor onto the edge-conveyor means in the SDO of the lone heating press by an operator facing the right side of the press, and the processed book is discharged from the SDO of the lone cooling press onto a discharge conveyor, these conveyors during operation, being in essentially the same lateral plane. Return of a book after the sandwich is stripped from the carrier (book is unloaded), then re-charged with a fresh sandwich, is along a return path which is parallel to the longitudinal x-axis and laterally displaced therefrom in the same plane as the edge-conveyor means.
Figure 2:
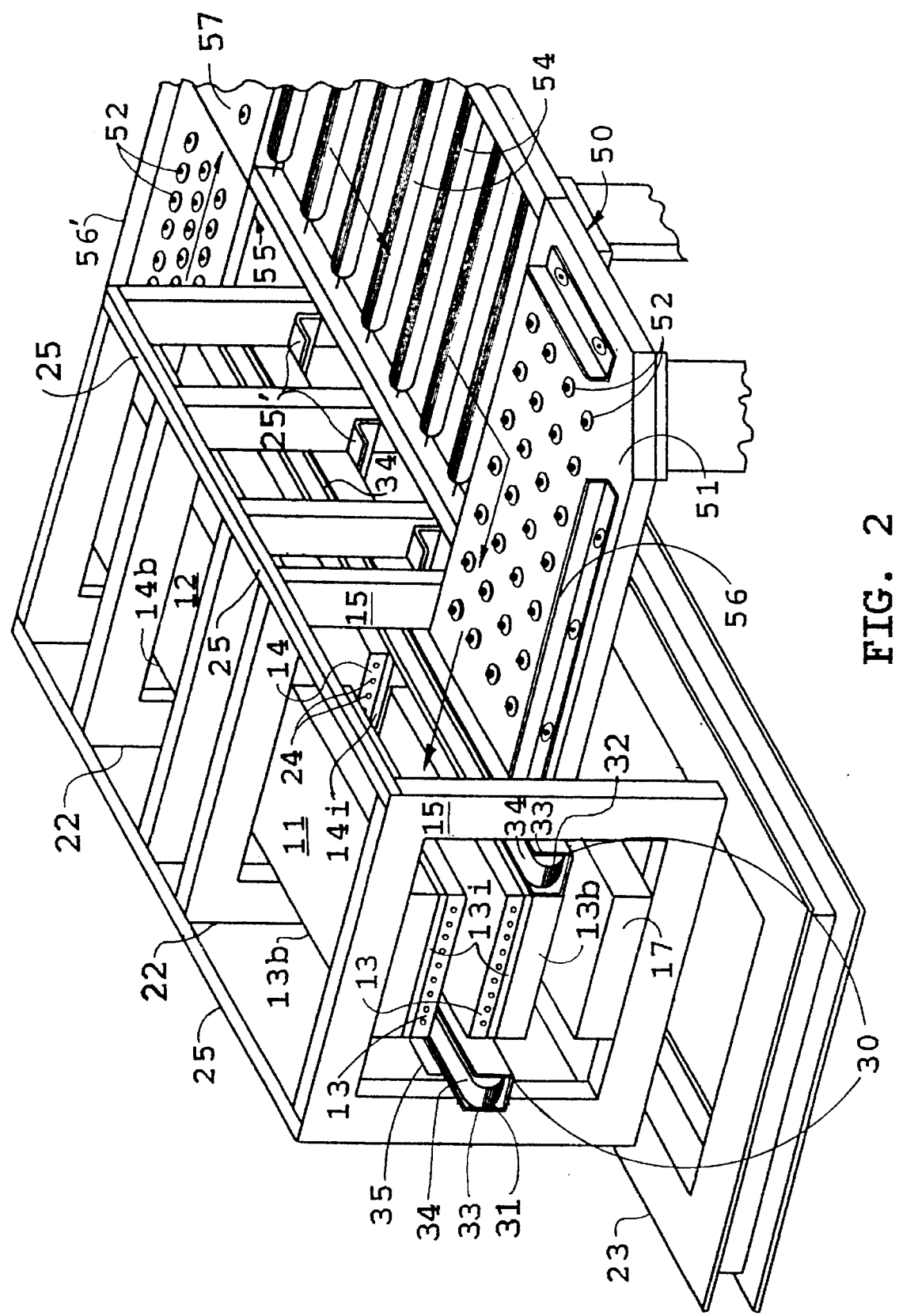
FIG. 2 is a perspective view of the system using the basic machine without an entrance station, showing the essentially coplanar configuration of the loading-path, the edge-conveyor means which determines the process-path of a book through the open window frames, and the discharge station at which a roller ball means returns the book in a transverse direction to the process-path. After the book is unloaded and the carrier re-charged, it is then directed as before, to a loading means extending no further than the front of the heating press; the loading- and discharge conveyors are shown with the preferred roller ball surfaces on which books are easily transferable so that the operator never has to lift a book which may weigh from 15 Kg (31 lb) to 50 Kg (110 lb).
Figure 3:
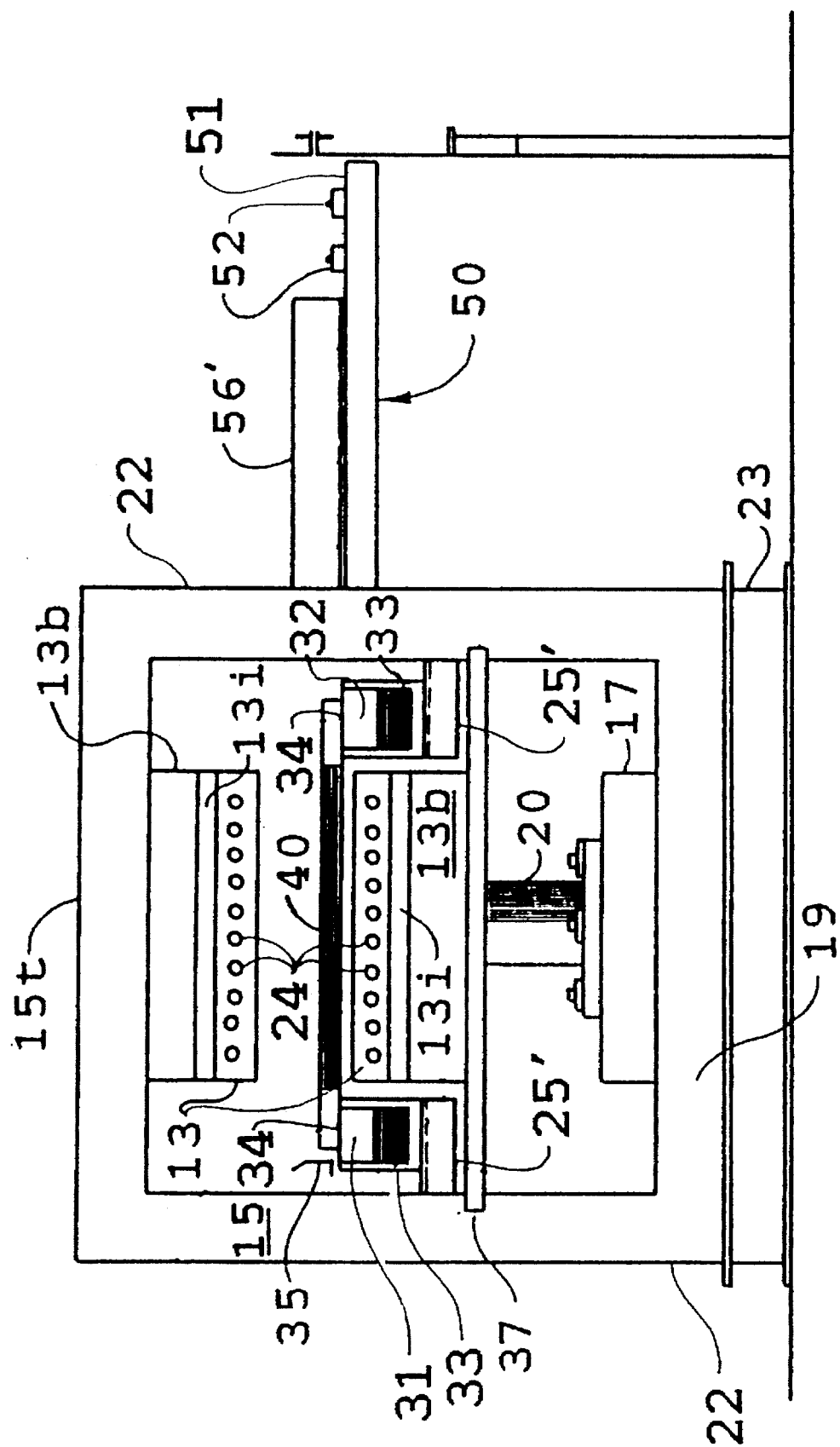
FIG. 3 is a front end elevational view of the machine shown in FIG. 2, showing the coplanar configuration of the path a book travels through the system, and the open space between the spaced-apart edge-conveyors provided by the window frame structure.

In this first embodiment, illustrated in FIGS. 1, 2, and 3, there is shown a plan view, a perspective view, and a front elevational view, respectively, of a laminating system, referred to generally by reference numeral 10, having two substantially identical heating and cooling presses 11 and 12, respectively, (with their daylights) axially aligned, one (the cooling press 12) behind the other (the heating press 11) longitudinally along the process-path (along the x-axis) to be followed by a book. Heating press 11 has upper and lower platens 13 (given the same numbers because they are substantially identical); and cooling press 12 has upper and lower platens 14. Upper platens 13 and 14 are fixedly mounted to bolsters 13b and 14b, respectively, and spaced therefrom by insulation pads 13i and 14i. The bolsters 13b and 14b are preferably welded to upper transverse members 15t of several successive window frames within which the two presses are mounted. The window frames are of rigid material, typically steel having a cross-section of about 5 cm×10 cm (2"× 4") which when aligned provide a flow-through processing zone which, when the lower platens are lowered, contains no structural element between the edge-conveyors on each side, and between the upper and lower platens; and, this processing zone is in open communication with the atmosphere at the front and rear of the frames.

Two window frames, each securing opposed longitudinal ends of the upper bolster 13b are generally sufficient for the heating press, since the pressure required during heating is generally lower than 1378 kPa (200 psi) for PVC split core sheets conventionally used for the purpose. A lower or higher pressure may be required to laminate credit cards made from other thermally sensitive and thermobondable materials.

However, cooling is preferably effected under higher pressure, typically 2756 kPa (400 psi), and additional reinforcing window frames may be required for the upper bolster 14b of the cooling press. Adequate reinforcing must be provided particularly if the pressure in the cooling press is in the range from about 3450 Kpa (500 psi) to 6890 kPa (1000 psi). As shown, a total of five window frames are preferably used for PVC laminates herein. All main operating components of the laminating machine are mounted within the processing zone and there is no structural interference to the operation of the rams 20, each carrying a lower platen 13.

The temperatures of each heating platen is maintained essentially constant at a temperature sufficiently above the Tg or melting point of at least one of the materials to be laminated, so as to allow for the temperature gradient across the cross-section of a sandwich and the resulting loss in heat transfer, yet at least reach, and preferably exceed the thermobonding or laminating temperature without exceeding it excessively. The temperature of the heating platens for laminating PVC core sheets to PVC overlays, or to overlays of amorphous Kodar polyester, is preferably obtained with electrical resistance heating means which provide adequate heat duty for the task at hand, and which maintains the platens in the range from 121° C. (250° F.) to 232° C. (450° F.) depending upon the combined heat duty of the platen and book. In turn, this depends upon the number of sets in a sandwich, the thermal conductivity of the lamination pads and polished metal plates 44 (see FIG. 11) used, and the chemical structure and molecular weight of the polymers from which the sheets and overlays are formed. The optimum temperature for the platens is typically arrived at by simple trial and error to which one skilled in this art is enured.

The temperature of each cooling platen is also maintained essentially constant, and is typically maintained with platens internally cooled with cold water, or some other fluid which may be refrigerated. The temperature is typically maintained in the range from 10° C. (50° F.) to about 24° C. (75° F.) the preference being to keep the platens as cold as can economically be justified.

As shown in FIG. 3, base plate 17 is for mounting the actuating mechanisms for the vertically reciprocable rams which provide the motive force for the lower platens. Base plate 17 is welded to the lower transverse members 19, 19' (only 19 is visible), of the first and second window frames 15. The window frames in turn, are mounted vertically on a transport frame 23 which allows the laminating machine to be moved as a unit, from one location to another. The inner edges of the window frames are chamfered to 45° and in cooperation with lateral guide members 37 which are affixed for and aft each bolster 13b, guide the rams in a vertical direction, and prevent the bolster from rotating while the ram is being moved vertically, from a "daylight open" position to a "daylight closed" position.

Figure 10:
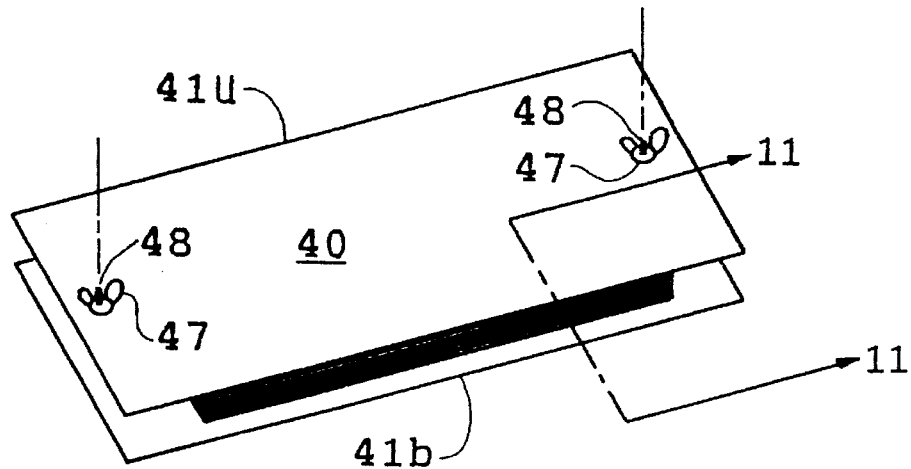
FIG. 10 is a perspective view of a book, showing the cover plates held together by wing nuts on threaded posts through the lower cover plate.
Figure 12:
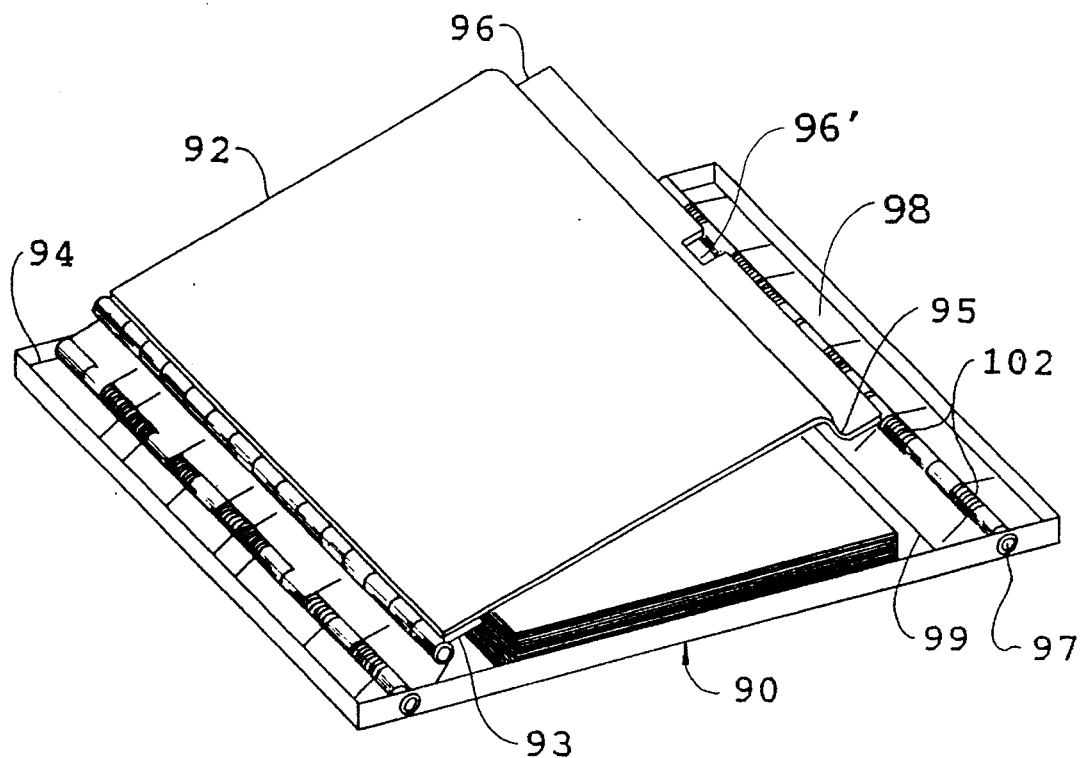
FIG. 12 is a perspective view of a novel "quick-locking" carrier from which a sandwich of laminates can be quickly stripped, and the carrier re-charged with a fresh sandwich.
Figure 13:
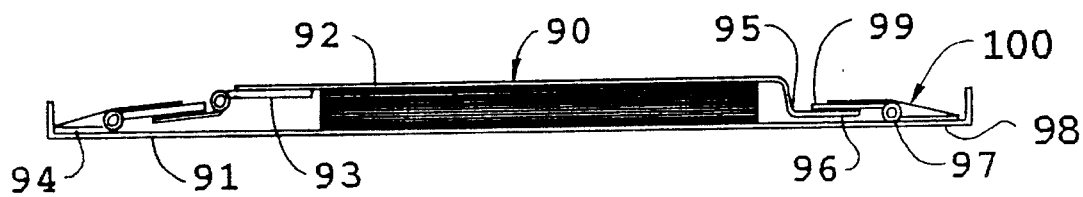
FIG. 13 is an end elevational view showing why the structural configuration of the carrier, when the cover plate is closed over a sandwich to form a book, maintains a desired pressure, determined by the springs, over the sandwich so as to minimize defects due to uneven pressure while the sandwich is being transported between stations, and after it is discharged.
Figure 14:
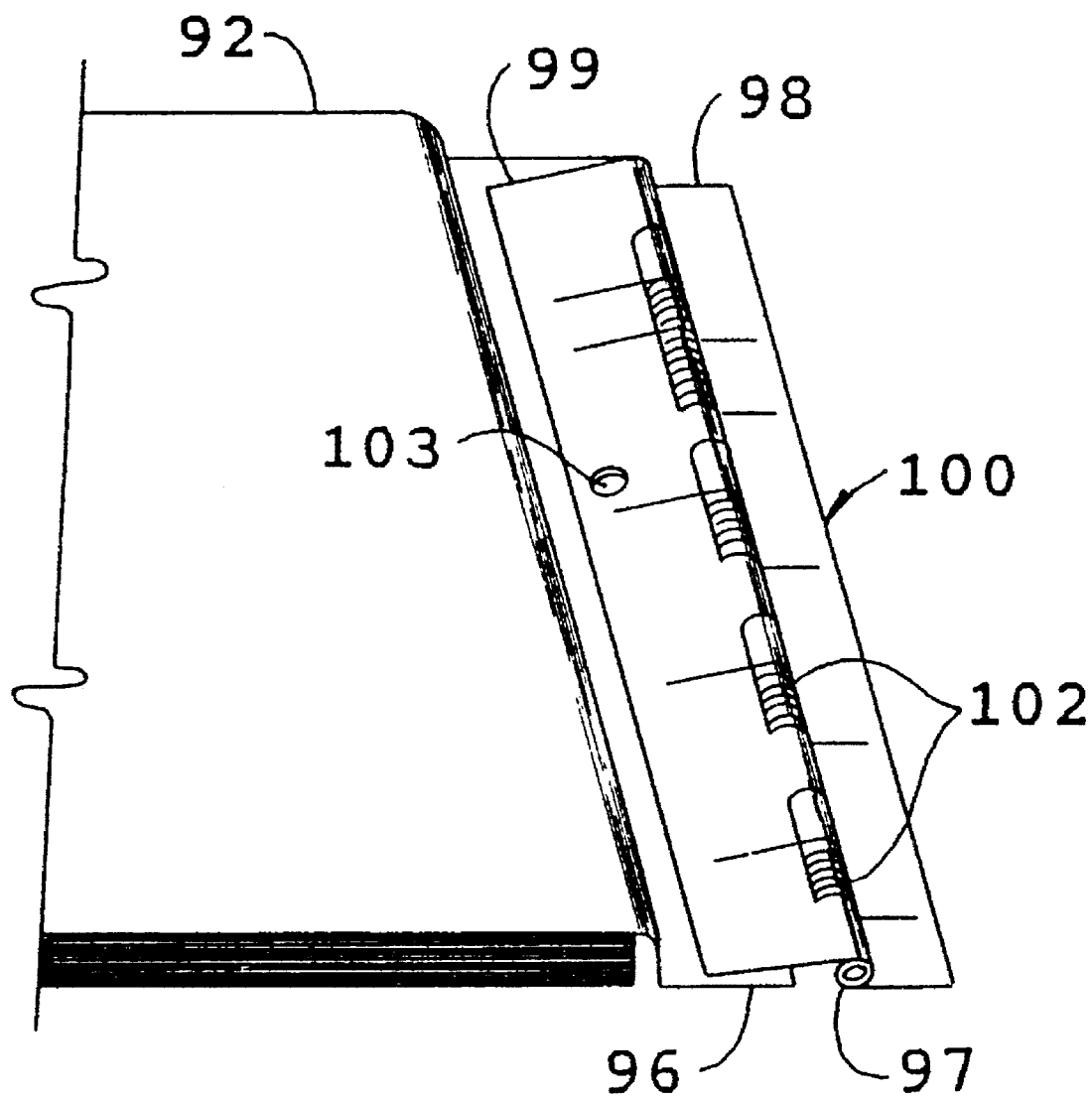
FIG. 14 is a perspective partial view showing a detail of the quick-locking and unlocking feature.

Since a conventional book 40, schematically illustrated in the perspective view in FIG. 10, is about 2.5 cm (1") in height, unless it contains a much larger or smaller number of sets than is usual, irrespective of the width and length of the cover plates of the carrier, there is no need to have a daylight greater (in height) than about 7.5 cm (3"). Therefore, the typical maximum travel of the ram is 7.5 cm. It will be appreciated that, with the use of wing nuts 47 with cooperating threaded rods 48, the space between the opposed fasteners must be such as to clear the upper and lower platens of a press, when the platens come in contact with the upper and lower plates of the book. A book which does not require projecting fasteners is shown in FIGS. 11–13, and will be described in greater detail herebelow.

Figure 11:
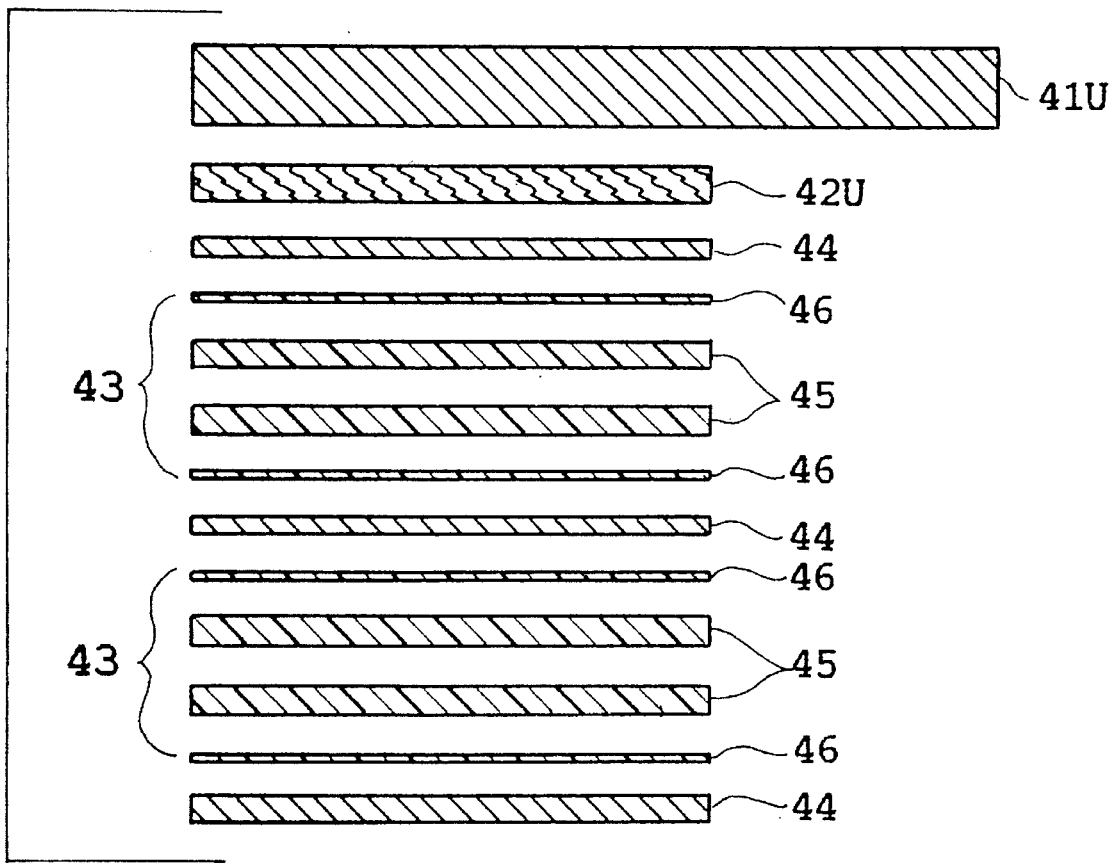
FIG. 11 is a side elevation exploded view, broken away, schematically illustrating on a much enlarged scale, the make-up of a book with a sandwich having only two sets ("2-up book").

As is shown in FIG. 11, the book 40 includes upper and lower cover plates 41u and 41b between which are held identical lamination pads 42u, 42b, and two "sets" 43 spaced apart by 3 polished plates 44, one plate in contact with each lamination pad, and one plate between the two sets. Each set 43 shown consists essentially of two split core sheets 45 and two overlays 46. If desired, an adhesive may be used to maintain the precise correspondence of the sheets and to facilitate lamination.

In FIG. 2, lower heating platen 13 is carried on an insulation pad 13i and a bolster 13b, which in turn is removably disposed on a hydraulically actuated up-acting ram. Both upper heating platen 13 and the lower heating platen 13 are provided with heating means 24 in the heating press; and upper and lower cooling platens 14 are provided with cooling means 21 21, the cooling press. The lower heating platen 13, and the lower cooling platen (not visible) are carried by the rams 20 of the hydraulic presses.

Essentially identical cross-braces 25, preferably of 7.5 cm×7.5 cm angle iron, are provided on the vertical members of the window frames, mounted so that one angle of each cross-brace projects in the lateral plane, at right angles to the vertical surfaces of the vertical members 22 of the window frames, and the upper surfaces of all the projecting angles are coplanar.

The edge-conveyor means, together identified generally by reference numeral 30, is unidirectional in the direction of the x-axis, in that it conveys a book deposited thereon in one direction only. The edge-conveyor preferably includes a pair of separate, endless loop conveyors 31 and 32 which are only wide enough to support the opposed edges of a book placed upon both 31 and 32. Each conveyor is an elongated, generally box-like frame having a substantially planar upper surface on which the upper run of a belt 34 travels, and, the box-like frame has rounded terminal ends over which the conveyor is looped. The conveyors 31 and 32 are mounted in laterally spaced apart relation to each other, in the horizontal (lateral) plane, on the lateral surfaces of the angles 25', so that the upper runs of the conveyors in each 31 and 32 lie in the same lateral plane.

In the first embodiment shown in FIGS. 1 and 3, in which the heating press is side-loaded, the distally disposed conveyor (relative to the operator loading a book) is provided with an edge guide 35 fixed to the far side of the box-like frame 33 to guide a book carried on the conveyor belt 34. The friction between the surfaces of the edges of the bottom of the book, and the material of the belt, is sufficient to maintain the position of the book on the opposed belts. A preferred belt material is made of a relatively inextensible fabric and rubber coated to provide a rough surface.

Any other edge-conveyor means may be used which effectively transports books synchronously for predetermined equal distances when it is stopped, this most preferably being effected with microswitches. For example, dual endless chain loops drivingly engaged upon sprockets may be used if at least one bottom edge of each book is provided with means to engage the chain positively, so that the book stops when and where the chain stops without any "carry"; and, so that the book is released when the lower platen advances the book vertically. An alternative is to use a single endless chain loop and an opposed, edge-guide in which the corresponding bottom edge of the book is securely carried, as is disclosed in the Noto et al U.S. Pat. No. 4,543,147, the disclosure of which is incorporated by reference thereto as if fully set forth herein.

Reverting again to FIGS. 1 and 3, the laminating system includes three conveyor means which are essential for economical operation of the system.

A loading-conveyor means 50 allows a book to be guided and preferably automatically urged with a pneumatic "pusher" (not shown), onto the edge-conveyor means 30. Loading conveyor 50 is preferably a stationary table having a roller ball surface 51 comprising a multiplicity of roller balls 52 over which a book is easily moved omnidirectionally. Roller balls 52 are used because side-loading a book onto the conveyor means 30, directly above the lower platen 13 of the heating press 11, requires a 90° change in direction of the path of the book after it is re-charged by an operator. The operator stands besides a feed conveyor 53 which is also a table, but presents a lateral surface 54s over which books are conveyed. This surface 54s tangential to multiple cylindrical rollers 54 laterally disposed in spaced apart relation along the longitudinal x-axis, so as to direct a book therealong substantially unidirectionally onto the surface 51 of the loading-conveyor means 50 where the tray contacts a deflector means 56 which deflects it, changing the direction of its path by 90°. As soon as the heating press discharges a heated book, a book from the entrance station is loaded in to the heating press, a re-charged book travelling along the y-axis on loading-conveyor 50, rolls on to the entrance station.

The feed conveyor 53 is coextensive only with the length of the cooling press 12. The feed-conveyor 53 is also used as a table upon which a book is unloaded and re-charged after it is received from a discharge-conveyor 55. Discharge conveyor 55 is sufficiently wide to receive a book which is guided by conveyor guide 58 longitudinally, then deflected when it contacts deflector 56' with the help of a pneumatic "pusher" (not shown) so as to change the direction of its path 90°. For ease and convenience, and because of the change of direction as on the loading-conveyor 50, the conveyor 55 has a surface 57 comprising a multiplicity of roller balls 52.

In the basic embodiment of the laminating system, the edge-conveyor means 30, is substantially coplanarly disposed in relation with each of the conveyors 50, 53 and 55 so that the path of a book through the system is a lateral essentially coplanar one, and the operator never has to lift a book.

Figure 4:
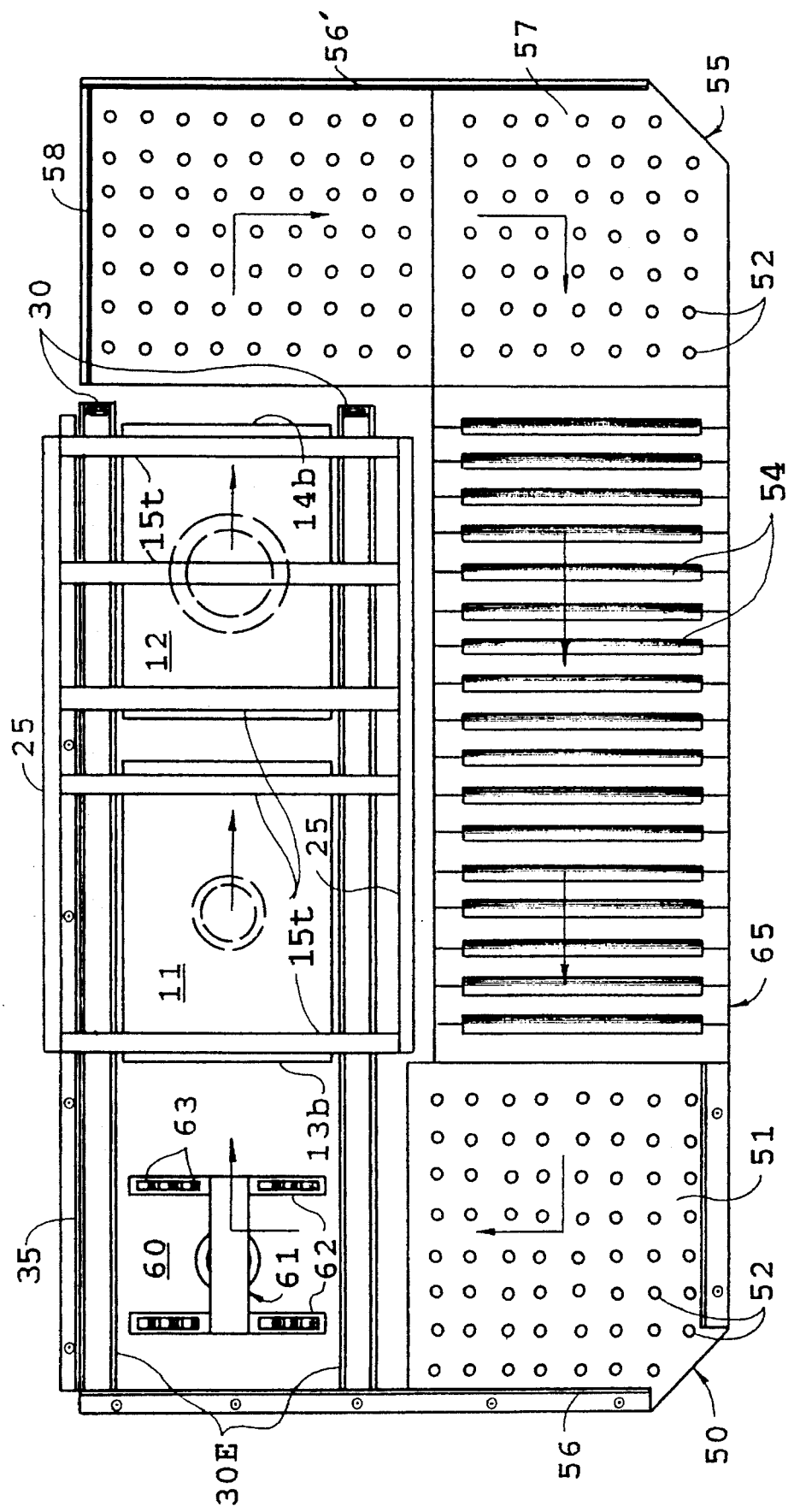
FIG. 4 is a top plan view of the front-loading embodiment (referred to as the "SDO extended front mode") of a SDO heating press and a SDO cooling press showing an entrance station for loading the heating press at the front of the machine, and the return of a book, after it is re-charged, along a return conveyor means in a path which is parallel to the longitudinal flow path of a book through the machine.
Figure 5:
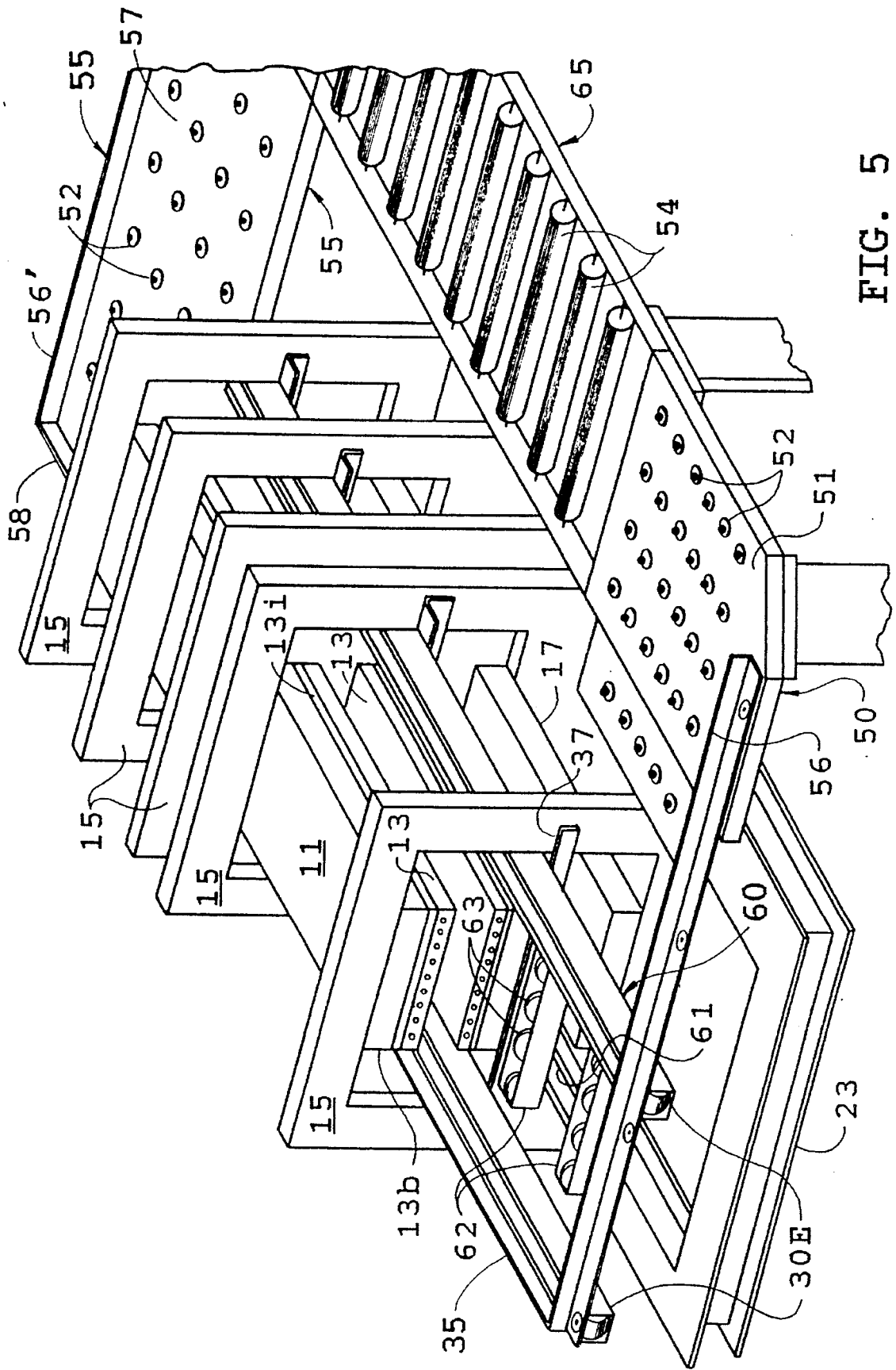
FIG. 5 is a perspective view of the "SDO extended front mode" shown in FIG. 4, diagrammatically illustrating the extension of the front portion of the edge-conveyor means through the first window frame, and extending further in front of the machine, with the loading conveyor positioned in front of and to the side of the heating press.

Referring now to FIGS. 4 and 5, there is shown a plan view and perspective view respectively, of the machine using only two presses, one a heating, the other a cooling press, each press with only a SDO, as in the basic embodiment, except that, the edge-conveyor means 30E extends in front of heating press 11, and loading conveyor 50 is positioned ahead of first press 11, because the path of a re-charged book is to be interrupted at entrance station 60.

Since the discharge conveyor 55 is the same as that used before in FIGS. 1–3, the feed conveyor 65 now is coextensive with the length of both the heating and cooling presses 11 and 12.

Because a book advanced to the entrance station 60 would fall in the space between the edge-conveyor means 30E if the book was not supported until the far edge rested on the far edge-conveyor means, a reciprocable table 61 is positioned in the space. The table 61 is movable up and down, from a level just below the upper surfaces of the edge-conveyor means 30E, to a level substantially coplanar with them, so that a book transferred transversely along the y-axis rolls onto wheel roller means 62 carried by the table 61. The wheels 63 in the roller means 62 are preferably aligned in the y-axis and their central axes spaced apart from each other in the x-y plane and along the y-axis.

Figure 6:
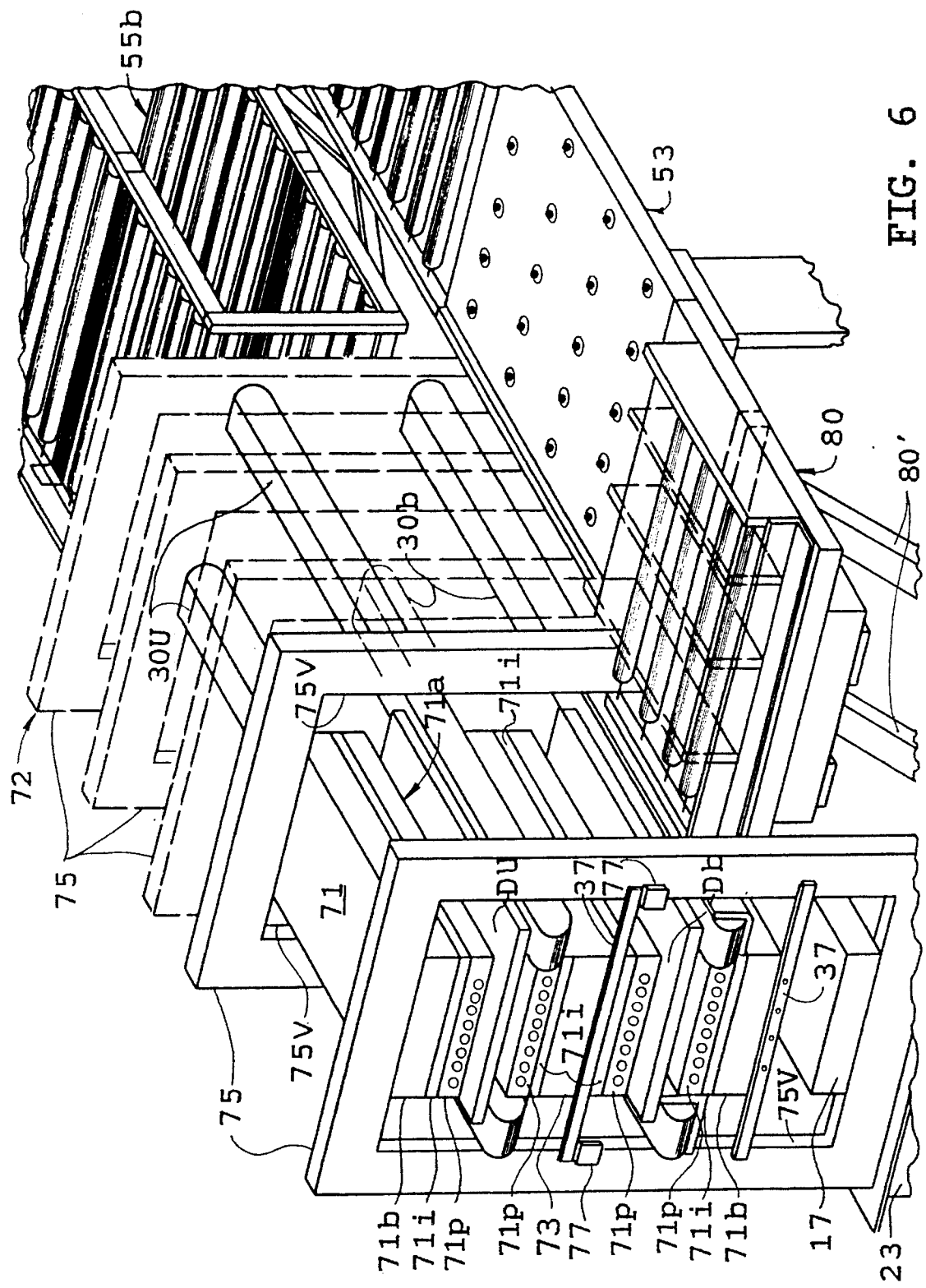
FIG. 6 is an isometric view of a lone first and a lone second MDO heating and cooling press, respectively, each press shown with only two daylights into each of which a book is loaded; each daylight is provided with a unique platen assembly comprising a single bolster sandwiched between an insulation pad and a platen on the upper and lower surfaces of the bolster which is guided on and floats between the vertical members of a window frame; each daylight has its own edge-conveyor means and discharge station in the same lateral plane as the edge-conveyor means, but no entrance station; and, a vertically reciprocable loading conveyor in partial phantom outline.
Figure 7:
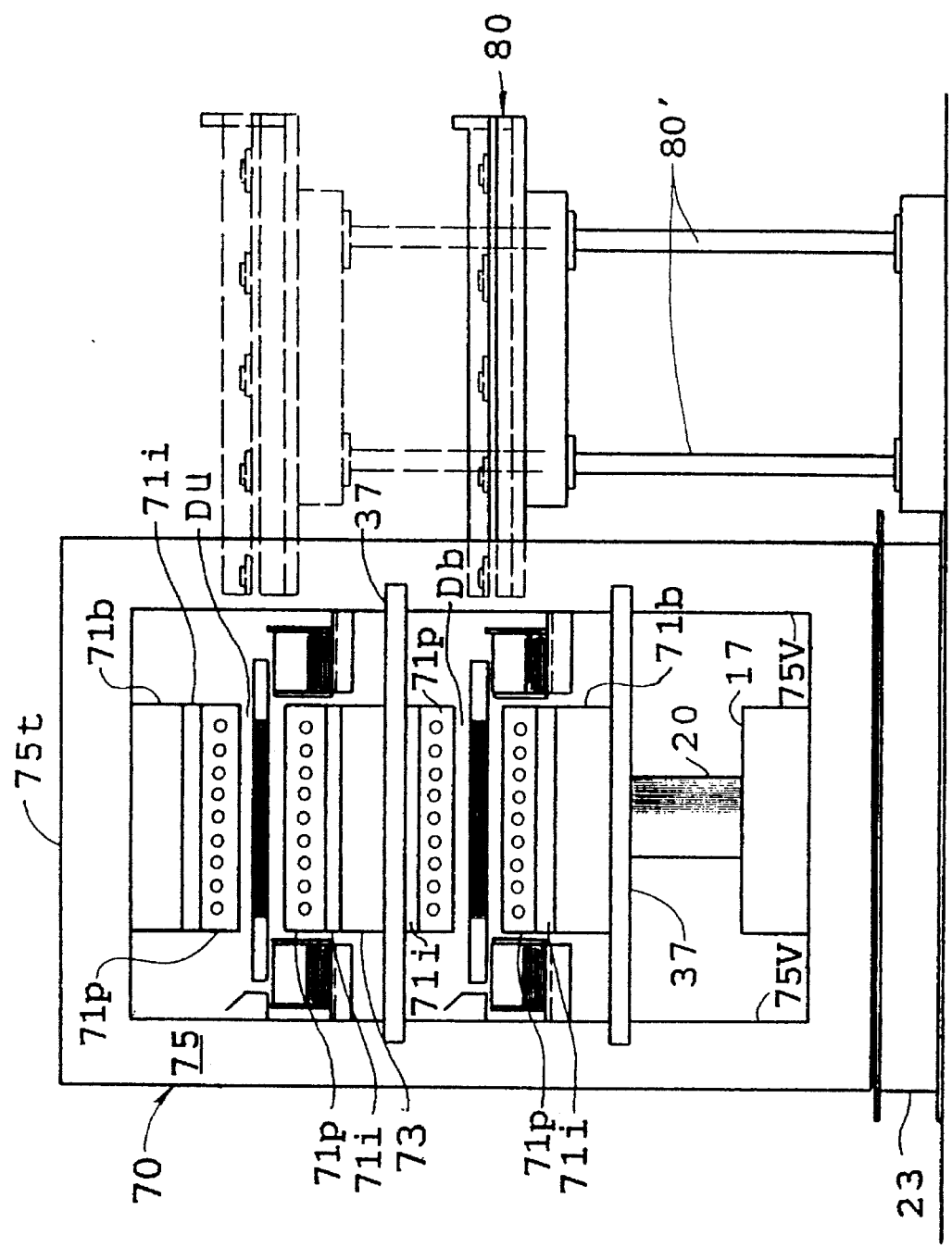
FIG. 7 is a front end elevational view of FIG. 6 showing the scissors lift as a preferred elevating/lowering means for offering a book to be loaded in substantially the same lateral plane as the edge-conveyor means.

Referring now to FIGS. 6 and 7 there is shown a side-loading MDO machine indicated generally as 70, with a lone heating press 71 and a lone cooling press 72, each having two "daylights", the cooling press being shown only partially, and in phantom outline because it is structurally identical to the heating press 71. In a top plan view the configuration of the machine 70 looks identical to that of the machine 10 in FIG. 1 since in plan view the conveyors 50, 53 and 55 look identical (and the top plan view is not duplicated).

In the perspective view shown in FIG. 6, plural window frames 75 are substituted for the window frames 15 in FIG. 1, the former being sized to accommodate presses which each have two daylights, each upper Du and lower Db daylight formed by unconnected, opposed separate platens facing one another. As before each upper platen 71p of each daylight is backed by an insulation pad 71i and bolstered with a bolster 71b. Each lower platen 71b with a guide bar 37 is mounted on a hydraulic ram 20 as before. Since the travel of the ram is about 7.5 cm, the lower surface of the belt 34 and the box-like member on which the belt is looped, must be more than 7.5 cm above the guide bar 37 at the top of the ram's travel.

Above and below each fixedly mounted edge-conveyor means 30u and 30b is positioned a platen assembly 71a comprising upper platen 71p of the lower daylight Db, its insulation pad 71i and a bolster 73 which is shared by Db and Du. The upper surface of 73 carries an insulation pad 71i and a platen 71b for the bottom of daylight Du. The common bolster 73 is provided with guide bar 37 which rests on index blocks 77 which are precisely located on opposed vertical window frame members 75v to ensure parallelism between the opposed microfinished faces of the platens.

The upper platen 71p of the upper daylight Du is mounted between transverse members 75t of the first and second window frames 75 in a manner analogous to that shown in FIGS. 1–3. Since the overall structural concept of this MDO press allows the addition of plural daylights by providing additional intermediate, freely floating, platen assemblies between the fixed upper platen and the lowermost platen on the ram 20, it is evident that one can supply as many daylights as can be effectively utilized. Though only two daylights are shown, a large machine may be constructed with ten or more, depending upon the exigencies of time and, the size of the "laminating window" dictated by properties of the polymer used.

Each daylight Du and Db is provided with its own entrance station 60u, 60b and discharge station 55u, 55b; and with its own edge conveyor 30u and 30b. As with the 2-SDO press embodiment, the travel of the ram is limited to the height of a daylight and the guide bar 37 cannot interfere with the edge-conveyor means. The limitations of a MDO are dictated by not only the ability to mechanically subject the upper and lower surfaces of each single set in a sandwich to a uniform pressure, but to load books sequential into each of the daylights provided and to discharge those books, within an economically satisfactory period of time.

Reverting again to FIGS. 1 and 4 which are top plan views for a two-SDO press machine, it will now be evident that the MDO embodiment may be operated in either system, depending upon the prejudice with respect to where an operator wishes to unload and re-charge processed books.

Referring particularly to the top plan view shown in FIG. 1 which will be adapted for use with the two-MDO press, side-loading machine described in FIGS. 6 and 7, because it eliminates using separate entrance stations, it is seen that, since each edge-conveyor means 30 fixes the lateral plane in which each book at each level is discharged, an elevatable loading-conveyor 80 (see FIG. 7) is provided on an elevatable lift, to receive a book at the lateral level of the feed-conveyor 53 the surface of which is fixed in the lateral plane with lower edge-conveyor means 30b. Preferably, a scissors lift shown in phantom outline loading a daylight, is used. Soon after a recharged book is received on the surface of the lift 80, a pneumatic "pusher" urges it into the open daylight with which it is coplanarly disposed. After the lower daylight Db is loaded, the lift 80 is retracted to the level of the feed-conveyor 53 to receive another book, and is then again elevated to deliver the book to the upper daylight Du.

After the daylights are loaded, the ram 20 elevates the lower platen of daylight Db until the book is compressed against the heated lower surfaces of the platen assembly 71a which in turn elevates the book in daylight Du until it is compressed against the fixed upper heating platen 71u on the window frame 75. The heating cycle commences as soon as the books are loaded since the press is maintained at a constant laminating temperature. Upon completion of the heating cycle, the books are lowered onto the edge-conveyor means 30u and 30b respectively and indexed to the cooling press 72. After the daylights in the heating press are again loaded, both the heating press 71 and the cooling press 72 are closed, and the heating and cooling cycles repeated. After the cooling cycle, the books are simultaneously discharged from each daylight Du and Db in the cooling press, onto separate discharge stations (not visible in this view) each coplanarly disposed relative to its respective edge-conveyor means.

Another elevatable lift (not shown), such as a multiple level scissors lift 80' is used adjacent the discharge stations, positioned as shown in FIG. 4, to receive the cooled books from their respective daylights on different levels of the scissors left 80. The scissors lift may then be translated to a position directly behind the feed conveyor and the books unloaded sequentially as the scissors lift is lowered, one level at a time to that of the roller feed conveyor.

Using the 2-MDO press configuration just described it will now be evident that the throughput/unit time of the number of laminates processed with the 2-MDO system is essentially double that of the 2-SDO system; or, the effective cycle time of a set as determined in a SDO machine, is halved.

Figure 8:
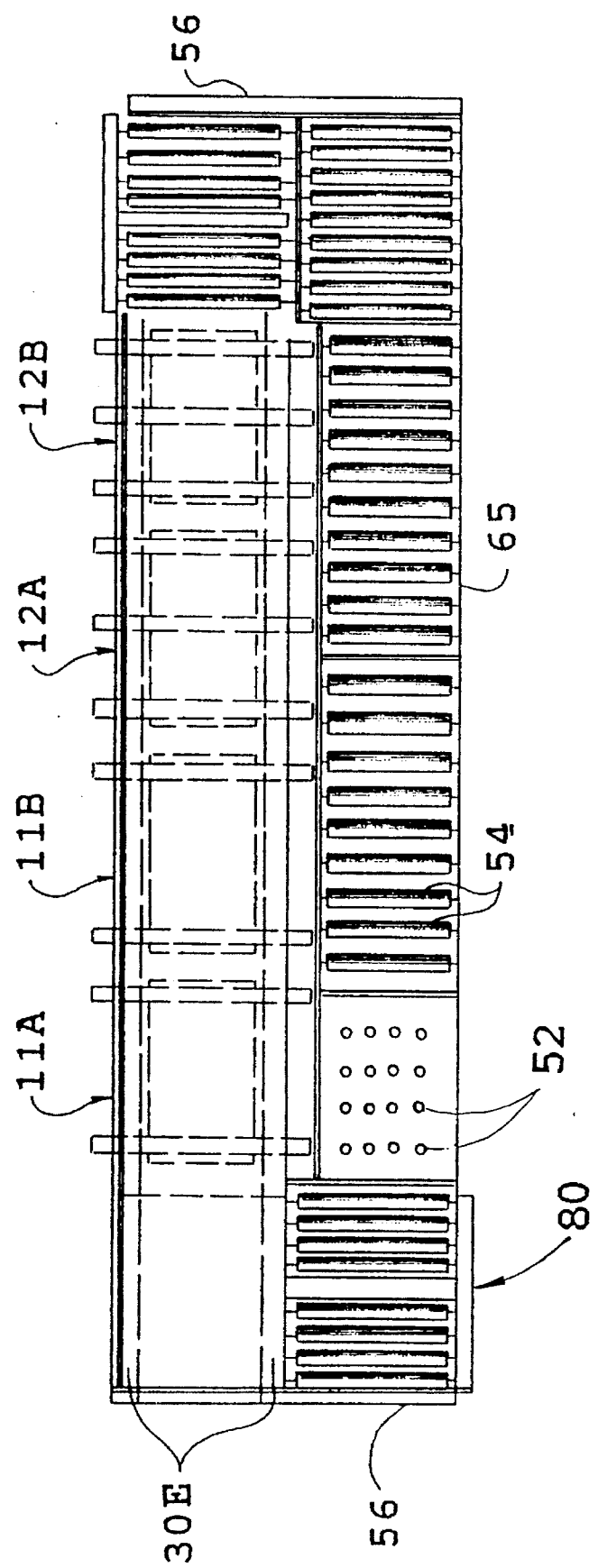
FIG. 8 is a top plan view of a front end loaded embodiment (referred to as the "ganged tandem SDO mode") in which two SDO heating presses followed by two SDO cooling presses are used in combination with the conveyors configured as in FIG. 1.

Still another embodiment of the laminating system which effectively halves the cycle time for processing a book is provided by the "ganged tandem SDO press" operation schematically illustrated in the top plan view in FIG. 8. It will be evident that this embodiment, shown here with an entrance station, is a modification of the configuration shown in FIG. 4, in which modification four aligned SDO presses, 11A, 11B, 12A and 12B are shown, the two additional SDO presses 11B and 12B (compared to FIG. 4) having been inserted in the process-path. Each press 11A and 11B are heating presses in which the pressure and temperature of each can be independently controlled. Similarly each press 12A and 12B are cooling presses in which the pressure and temperature of each can be independently controlled. However, the cycle time in each press is the same so that books are passed one after the other from each press to the next subsequent press simultaneously at preset interval of time to enable books to be discharged at a rate determined by the preset interval.

Books loaded into press 11A are preheated to a temperature below that required to "hot finish" a set; the platens in press 11A are maintained at a chosen temperature below the laminating temperature at which the platens of press lib are maintained. The platens in press 11B, which are maintained at the laminating temperature, can then quickly "finish" heat the sets in each sandwich. The cycle time for heating is thus split equally between preheat and the "finish heat" presses. Similarly, the cooling provided in the first cooling press is typically insufficient and provides only a "precool". When the books are transferred to press 12B they are "cold finish". Discharged books are returned over a conveyor configuration similar to that shown in FIG. 4.

Figure 9:
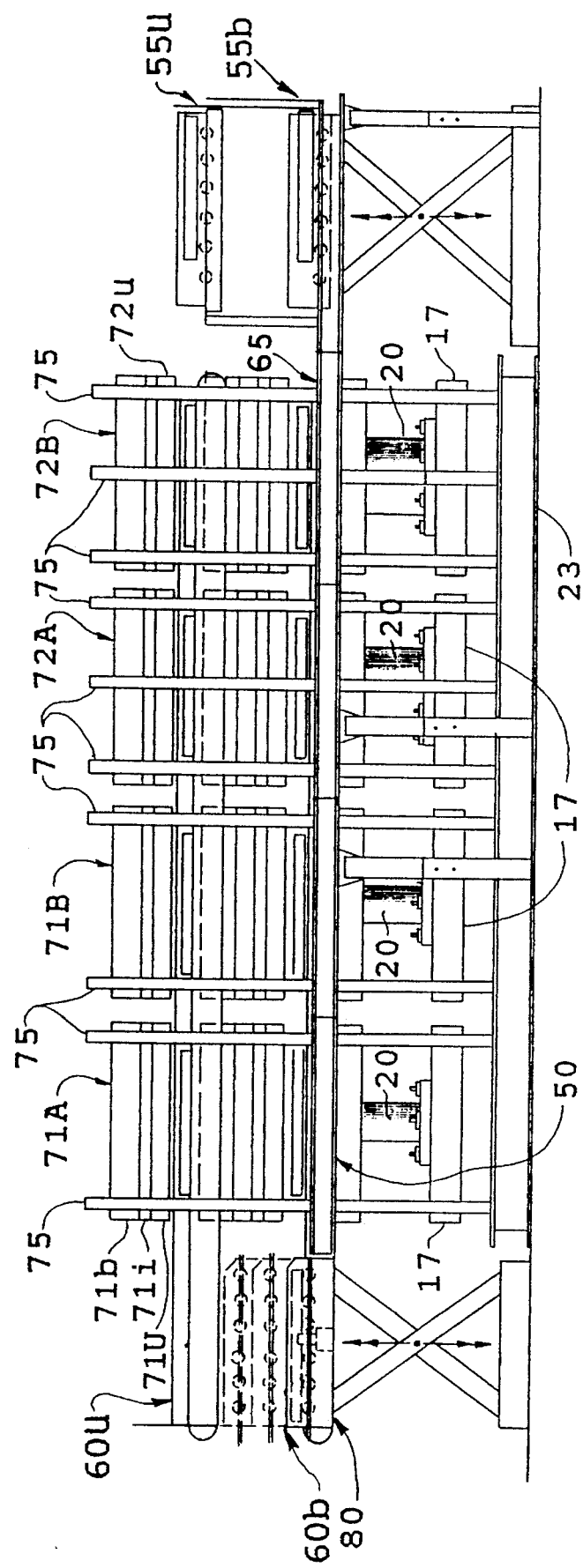
FIG. 9 is a side elevational view of end-loaded multiple MDO presses aligned to provide a preheat and a precool in what is referred to as the "ganged tandem MDO mode" analogous to the operation of the "ganged tandem SDO mode" shown in FIG. 8; only the lowest edge-conveyor means extends in front of the lowest daylight; and, showing separate essentially identical scissors lifts for receiving books discharged at separate vertically spaced apart levels.

Yet another, even higher capacity embodiment is presented in the illustration shown in side elevation in FIG. 9. This system, referred to as the "ganged tandem MDO mode" effectively doubles the capacity provided by the machine shown in FIGS. 6 and 7. In plan view, the system is analogous to the "ganged tandem SDO mode" shown in FIG. 8. The system shown in FIG. 9 includes 4 MDO presses 71A, 71B, 72A and 72B, each of which is shown with 2 daylights. Each press is the same as one which is shown in FIGS. 6 and 7. Each press is provided with its own "floating" platen assembly intermediate upper and lower platen assemblies; an entrance station in which the scissors lift 80 is positioned; an edge-conveyor to receive and transfer heated books from the lower plate of each daylight; and, a discharge-conveyor (the upper is not shown) coplanar with the edge-conveyor means.

As before, operation of this "ganged tandem MDO system" may be without an entrance station, to save on cost, or with an entrance station, if end-loading the presses is desired.

Referring again to FIG. 9, in which the option of end-loading is chosen, it is seen that scissors lift 80 is placed at the front entrance of the machine to accept re-charged books urged along the y-axis over the loading conveyor 50. Operation of the conveyor system is analogous to that described in FIGS. 6 and 7, and the preheat and precool temperatures are set in an analogous manner. The net result is that the cycle time for each book is halved compared to the cycle time in the mode shown in FIGS. 6 and 7.

Programming the presses and the conveyors, the electrical circuits to carry out all the functions of the machine, and the design of the fluid systems to actuate the components are all within the skill of the respective arts, properly instructed to do so, and form no part of this invention.

Referring to FIGS. 11–13, there is shown a novel quick-loading and quick-unloading carrier indicated generally by reference numeral 90 having a planar base plate 91 of a material having a thermal conductivity higher than 50 BTU/hr/ft$^2$/°F./ft, preferably aluminum, bronze, or alloys of the foregoing. The width and length of the plate is determined by the size of the laminate to be made and may be as large as 1 meter×2 meters. One lateral dimension of the base plate, the width, as shown in FIG. 11, is greater than the width of a sandwich of sets to be laminated. The thickness of the base plate is preferably limited to 1 cm (0.375") and is preferably less.

The cover plate 92, is a planar member with a downward break, preferably right angled to provide a step 95, near the right hand margin (as viewed in the drawing), leaving a laterally projecting marginal edge 96 along the entire width of the cover plate. Intermediate the ends of the marginal strip edge strip 96, preferably near its center, is provided a slot 96, wide enough to insert a prying means, such as a screwdriver 105 therethrough. When closed, the cover plate is coextensively disposed over essentially the entire base plate 91, with the marginal edge strip 96 lying superimposed upon the upper surface of the base plate 91.

Near the right hand margin of the base plate 91, is provided an elongated hinge means 100, including a hinge pin 97 and hingedly interdigitated locking strips 98 and 99 through the marginal apertures 101 thereof, the hinge pin 97 is inserted. In addition, the marginal apertures 101 are spaced apart sufficiently to accommodate plural spring means 102 coaxially aligned on the hinge pin 97. The locking strip 98 is securely fastened to the base plate, preferably by welding thereto along the entire outside edge of the strip. The spring means 102 biases the locking strip downwards so that it is normally tightly pressed against the base plate 91, but is tightly biased upon and against the marginal edge strip 96 when the cover plate is closed over a sandwich 104, as shown in FIG. 13.

The thickness of the sandwich 104 held down by the cover plate is matched to the height of the step 95, being greater than this height, so that after the book is compressed in a press, the marginal edge strip 96 will fail to contact the upper surface of base plate 91. In the locking strip 99, a through passage 103 is drilled at a point where the slot 97 overlays the locking strip 99, the hole being large enough to afford purchase for the screwdriver 105, to be used to pry under the marginal edge strip 96, so as to release it from under the locking strip 99.

The opposed (left hand) marginal edge of the cover plate 92 is welded or otherwise fixedly secured to one side of a hinge means, preferably a piano hinge 93, which hingedly coacts with a marginal strip 94, so as to allow the cover plate to be lifted to at least a vertical position, and preferably, to rest in an essentially flat position over the marginal strip 94. The marginal strip 94 is hingedly connected, by hinge means 100 in a manner analogous to that described hereinabove, and functions to bias the marginal edge 94 downwards against the base plate when the carrier is empty.

The effectiveness of the oppositely disposed coacting hinges 100 is readily appreciated with an understanding of the configuration shown in FIG. 13. When the right marginal edge strip 96 is locked down by prying up on the locking strip 99 and inserting the strip 96 under the strip 99, the step 95 firmly secures the sandwich adjacent to the step.

At the opposite marginal strip 94, the pressure exerted by the cover plate forces the piano hinge to an elevated position. However, as the sandwich is compressed in a press, the piano hinge is lowered as the cover plate approaches the base plate. It is now apparent that the novel carrier can be quickly charged with a sandwich in a highly effective manner, and just as quickly unloaded.

Having thus provided a general discussion, described the overall laminating system and the process of laminating a "set" in detail and illustrated the invention with specific examples of the best mode of making and using it, it will be evident that the invention has provided an effective solution to the problem of mass-producing laminates reliably, reproducibly and inexpensively. It is therefore to be understood that no undue restrictions are to be imposed by reason of the specific embodiments illustrated and discussed, and particularly that the invention is not restricted to a slavish adherence to the details set forth herein.

I claim:

1. In combination, a laminating machine having first and second daylight openings for producing a laminate of plural cards each carrying data on at least one core sheet of flexible core stock of uniformly thick thermobondable synthetic resinous material less than about 1.25 mm (50 mils) thick, having an upper and a lower surface to each of which is thermally and/or adhesively bonded an overlay of uniformly thin thermobondable synthetic resinous material less than about 0.25 mm (10 mils) thick, and having lengthwise and widthwise dimensions essentially the same as those of said core sheet, with a carrier for use in presenting an assembly of laminar sheets to a platen press comprising, a platen heating press, to heat and essentially concurrently press, a laminar assembly or 'set' in said carrier, said heating press having a single daylight opening provided by an upper fixedly mounted heating platen and a lower reciprocable heating platen;

a platen cooling press, to cool and essentially concurrently press said laminar assembly or set in said carrier, at a pressure the same as said heating press, or different, said cooling press having a single daylight opening provided by an upper fixedly mounted cooling platen and a lower reciprocable cooling platen, said cooling press being separated from and proximately disposed behind said heating press;

said first and second daylight openings being coaxially disposed in a longitudinal direction, along the longitudinal x-axis, along which said carrier travels in a linear processing path determined by successive first and second paths, with stops of chosen identical duration in each said first and second daylight openings, with travel in said first path, to and out of said first opening, and travel in said second path, to and out of said second opening being coplanar and in the same lateral plane;

carrier-loading conveyor means for transferring successive carriers, one at a time, by feeding them into said first opening;

laterally spaced apart endless loop edge-conveyor means drivingly engaged to transfer each carrier in a unidirectional processing path along the longitudinal x-axis direction only, while opposed lateral edges of said carrier rest upon parallel members of said edge-conveyor means transversely spaced apart along the y-axis, orthogonal to said x-axis, said members of said edge-conveyor means lying in substantially said same lateral plane;

means for stopping said edge-conveyor means so as to index each carrier directly vertically above each said lower platen, simultaneously;

means for operating said heating and cooling presses concurrently, to compress each said laminar assembly or set in said carrier in each said press, at a predetermined temperature and pressure, essentially simultaneously, at predetermined intervals;

means for operating said edge-conveyor means, to convey a heated and compressed laiminar assembly or set to a location directly above said lower cooling platen, and simultaneously to convey a cooled carrier onto a discharge station;

means for locating said lower heating and cooling platens of said heating and cooling presses, to index each substantially coplanarly in said lateral plane after each of said presses is opened, so as to lower each carrier from each lower platen onto said conveyor means;

means for actuating operation of said edge-conveyor means after said presses are opened to discharge a book from said cooling press;

said carrier comprising: a base plate and a cover plate between which said laminar assembly or set is compressibly held.

2. The machine of claim 1 wherein said endless loop edge-conveyor means comprises twin loop conveyors; and, discharge conveyor means for conveying a discharged book to be unloaded, said discharge conveyor means having an upper surface which is essentially coplanarly disposed with said edge-conveyor means when said book is discharged.

3. The machine of claim 2 wherein said book-loading conveyor means has an upper surface comprising roller means.

4. The machine of claim 2 wherein said endless loop conveyors are twin, synchronously operable belt conveyors.

5. The machine of claim 2 wherein said book-loading conveyor means directly transfers said books one at a time along a loading path orthogonal to said processing path and into said first opening, without interrupting the loading path with an entrance station.

6. The machine of claim 2 wherein said machine is front-end loaded by said book-loading conveyor means which transfers said books one at a time along a loading path aligned with said processing path, and into said first opening, without interrupting the loading path with an entrance station.

7. The laminating machine of claim 1 including in addition, a second heating press separated from and proximately disposed behind said first heating press which provides a "hot finish", each said heating press having a lower reciprocable heating platen; a second cooling press separated from and posteriorly proximately disposed relative to said first cooling press which provides a "cold finish", each said cooling press having a lower reciprocable cooling platen; and, means for locating said lower heating and cooling platens of said heating and cooling presses to index each substantially coplanarly in said lateral plane after each of said presses is opened, so as to lower each book from each lower platen onto said conveyor means.

8. In combination, a laminating machine for producing a laminate of plural cards, each carrying data and/or information on at least one core sheet of flexible core stock of uniformly thick thermobondable synthetic resinous material less than about 1.25 mm (50 mils) thick, having an upper and a lower surface to each of which is thermally and/or adhesively bonded an overlay of uniformly thin thermobondable synthetic resinous material less than about 0.025 mm (10 mils) thick, and having lengthwise and widthwise dimensions essentially the same as those of said core sheet, with a carrier for use in presenting an assembly of laminar sheets to a platen press, comprising, a platen heating press to heat and essentially concurrently press, a laminar assembly or 'set' in said carrier, said heating press having multiple daylight openings provided by an upper fixedly mounted heating platen and a lower reciprocable heating platen, and at least one platen assembly intermediate said upper and lower platens, each platen and platen assembly being unconnected to another;

a platen cooling press to cool and essentially concurrently press said laminar assembly or set in said carrier, said cooling press being separated from and posteriorly proximately disposed relative to said heating press, said cooling press having multiple daylight openings provided by an upper fixedly mounted cooling platen and a lower reciprocable cooling platen, and at least one platen assembly intermediate said upper and lower cooling platens, each platen and platen assembly being unconnected to another;

said multiple daylight openings in said heating and cooling presses being correspondingly coaxially disposed in a longitudinal direction, along the longitudinal x-axis, along which said carrier travels in a linear processing path determined by successive first and second paths, with stops of chosen identical duration in each of said multiple openings, with travel in a first path to and out of corresponding daylight openings in said first press being coplanar in the same first lateral plane, and travel in a second pass to and out of corresponding daylight openings in said second press being coplanar in the same second lateral plane, wherein said first and second lateral planes are vertically spaced apart at a distance at least equal to the travel of a means which advances said lower platens vertically;

carrier-loading conveyor means for directly transferring successive carriers, one at a time, to said multiple daylight openings in said heating press, by feeding said carriers in a path selected from (i) a loading-path orthogonal to said processing path into said first opening, without interrupting the loading path with an entrance station, and, (ii) an entrance station which provides a loading-path parallel to said processing path through corresponding daylight openings in said presses;

multiple edge-conveyor means, vertically spaced apart from each other, for transferring each carrier in a unidirectional processing path along the longitudinal x-axis direction only, while opposed lateral edges of said carrier rest upon parallel members of each said edge-conveyor means transversely spaced apart along the y-axis, and orthogonal to said x-axis, said members of each said edge-conveyor means lying in a substantially lateral plane;

means for stopping said each edge-conveyor means simultaneously so as to index each carrier directly vertically above each said lower platen in each daylight opening;

means for operating said heating and cooling presses concurrently, to compress each said assembly in said carrier in each said press, at a predetermined temperature and pressure, essentially simultaneously, for the same chosen period; means for locating said lower reciprocable heating and cooling platens of said presses, to index each platen substantially coplanarly in a lateral plane after each of said presses is opened, so as to lower each carrier from each lower platen in each daylight, onto said conveyor means;

means for operating said edge-conveyor means, to convey a heated and compressed laminar assembly or set to a location directly above said lower cooling platen, and simultaneously to convey a cooled carrier onto a discharge station; means for actuating operation of each said edge-conveyor; and, means simultaneously to discharge a carrier from each daylight of said cooling press;

said carrier comprising: a base plate and a cover plate between which said laminar assembly or set is compressibly held.

9. The machine of claim 8 wherein each press comprises, a window frame mounting means having transverse upper and lower members and vertical side members, and said upper platen is fixedly mounted upon said upper transverse member; and, at least one intermediate platen assembly comprising, a bolster, a pair of insulation pads, each coextensively covering said bolster on either side thereof, and securely affixed thereto;

a pair of internally temperature controlled platens, each coextensively disposed upon each said insulation pad and securely affixed thereto, on either side of said bolster; and, guide means affixed to one end of said assembly, said guide means in cooperation with said vertical member, being reciprocable in a vertical direction over a distance no greater than the height of a daylight opening.

10. The laminating machine of claim 9 including in addition, multiple discharge conveyor means, each for conveying a discharged book to be unloaded, each said discharge conveyor means having an upper surface which is essentially coplanarly disposed with each said edge-conveyor means when said cool book is discharged.

11. The laminating machine of claim 9 including in addition, a multiple daylight opening preheating press separated from, and proximately disposed behind said multiple daylight opening heating press which provides a "hot finish"; and, a multiple daylight opening precooling press separated from, and posteriorly, proximately disposed relative to said multiple daylight opening cooling press which provides a "cold finish".

12. In combination, a laminating machine having first and second daylight openings for producing a laminate of plural cards each carrying data on at least one core sheet of flexible core stock of uniformly thick thermobondable synthetic resinous material less than about 1.25 mm (50 mils) thick, having an upper and a lower surface to each of which is thermally and/or adhesively bonded an overlay of uniformly thin thermobondable synthetic resinous material less than about 0.25 mm (10 mils) thick, and having lengthwise and widthwise dimensions essentially the same as those of said core sheet, with a carrier for use in presenting an assembly of laminar sheets to a platen press comprising, a platen heating press, to heat and essentially concurrently press, a laminar assembly or 'set' in a book having an upper and a lower cover plate, said heating press having a single daylight opening provided by an upper fixedly mounted heating platen and a lower reciprocable heating platen;

a platen cooling press, to cool and essentially concurrently press said set in said book, at a pressure the same as said heating press, or different, said cooling press having a single daylight opening provided by an upper fixedly mounted cooling platen and a lower reciprocable cooling platen, said cooling press being separated from and proximately disposed behind said heating press;

said first and second daylight openings being coaxially disposed in a longitudinal direction, along the longitudinal x-axis, along which said book travels in a linear processing path determined by successive first and second paths, with stops of chosen identical duration in each said first and second daylight openings, with travel in said first path, to and out of said first opening, and travel in said second path, to and out of said second opening being coplanar and in the same lateral plane;

book-loading conveyor means for transferring successive books, one at a time, by feeding them into said first opening;

laterally spaced apart endless loop edge-conveyor means drivingly engaged to transfer each book in a unidirectional processing path along the longitudinal x-axis direction only, while opposed lateral edges of said book rest upon parallel members of said edge-conveyor means transversely spaced apart along the y-axis, orthogonal to said x-axis, said members of said edge-conveyor means lying in substantially said same lateral plane;

means for stopping said edge-conveyor means so as to index each book directly vertically above each said lower platen, simultaneously;

means for operating said heating and cooling presses concurrently, to compress each said set in said book in each said press, at a predetermined temperature and pressure, essentially simultaneously, at predetermined intervals;

means for operating said edge-conveyor means, to convey a heated and compressed book to a location directly above said lower cooling platen, and simultaneously to convey a cooled book onto a discharge station;

means for locating said lower heating and cooling platens of said heating and cooling presses, to index each substantially coplanarly in said lateral plane after each of said presses is opened, so as to lower each book from each lower platen onto said conveyor means;

means for actuating operation of said edge-conveyor means after said presses are opened to discharge a book from said cooling press;

said carrier comprising: a base plate; a cover plate with a first and second hinge means connecting said base plate to said cover plate; and a spring means operatively connected between said first and second hinge means.

* * * * *